Figures 1, 2, 3:
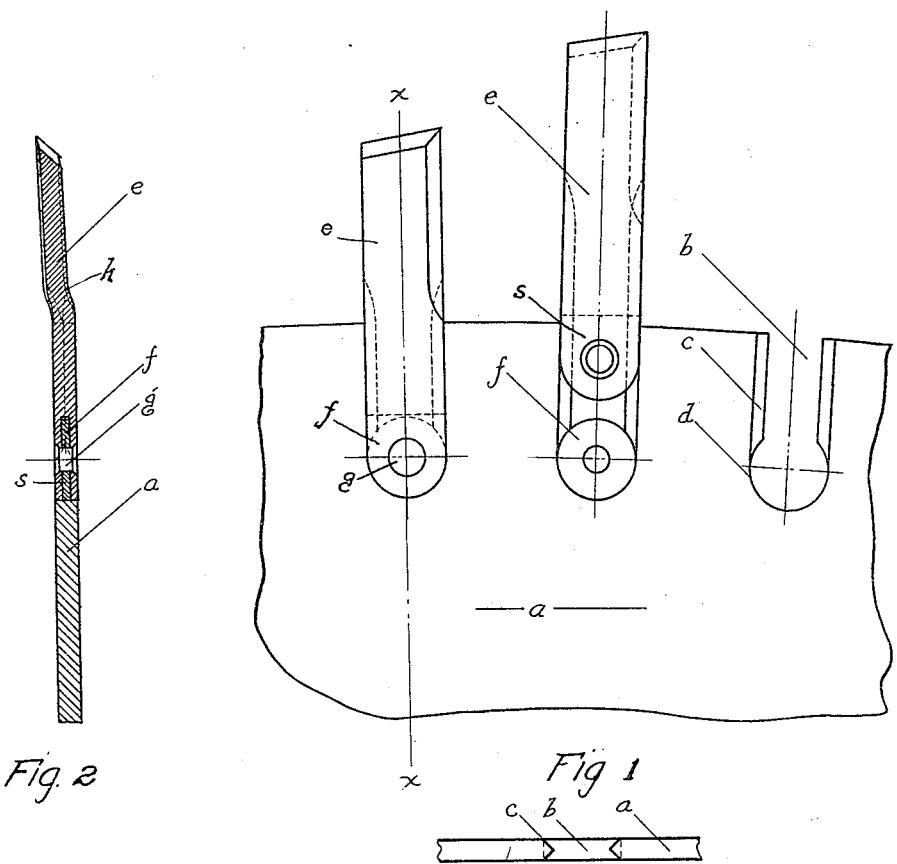

A. M. REMINGTON.
SEPARABLE TOOTH FOR SAWS.
APPLICATION FILED JULY 3, 1914.

1,117,090.

Patented Nov. 10, 1914.

WITNESSES
Chas. E. Woods
John A. Jones

INVENTOR
Alfred M. Remington

UNITED STATES PATENT OFFICE.

ALFRED M. REMINGTON, OF FITCHBURG, MASSACHUSETTS, ASSIGNOR TO SIMONDS MANUFACTURING COMPANY, OF FITCHBURG, MASSACHUSETTS, A CORPORATION OF MASSACHUSETTS.

SEPARABLE TOOTH FOR SAWS.

1,117,090.   Specification of Letters Patent.   Patented Nov. 10, 1914.

Application filed July 3, 1914. Serial No. 848,712.

*To all whom it may concern:*

Be it known that I, ALFRED M. REMINGTON, a citizen of the United States of America, residing at Fitchburg, in the county of Worcester and Commonwealth of Massachusetts, have invented certain Improvements in Separable Teeth for Saws, of which the following is a specification.

This invention relates to improvements in saw teeth commonly known as inserted teeth, which are made separate from the saw-plate and are inserted in suitable notches or openings in the edge thereof where they are securely held by means readily removable without injury to the plate, so that the teeth may be removed when worn beyond practical utility or broken; and the invention consists of a tooth adapted to be inserted in an opening the counterpart of the inner end of the tooth and extending inward from the edge of the saw-plate, the inner end of the tooth having a slot parallel with its exterior faces, and adapted to slide over and receive a washer previously inserted in a suitable chamber formed in the saw-plate at the inner end of the tooth opening. This washer has a hole through it and holes, corresponding thereto in position, are formed in the inner end of the tooth through the portions upon either side of the slot therein. The washer is prevented from moving outward in its chamber or in a direction radially of the saw-plate, by means of projections on the sides of the tooth opening, which projections may be extended to the outer end of the opening and serve as guides and retaining means for the tooth. For the purpose of holding the tooth securely in the plate after it has been inserted into its opening with the washer properly seated in the slot at its inner end, a rivet or screw is passed through the holes in the respective members and one or both ends thereof headed up, thus securely holding the tooth in place in the plate, the number of teeth thus secured depending upon the size of the saw and the amount of space between the teeth desired. Further, before the separate teeth are tempered, the outer or cutting end of each is offset or bent out of line with the inner end of the tooth, in lieu of the usual setting of the teeth, alternate teeth being offset in opposite directions.

In the drawings forming a part of this specification,—Figure 1 is a side elevation of a portion of a saw-plate, showing openings therein for three teeth, two teeth being shown, one fully inserted in its opening and one partially; Fig. 2 is a vertical section through the tooth and plate on line $x$—$x$, Fig. 1; and Fig. 3 is a view of the tooth opening in the plate looking down into the third or unoccupied one shown in Fig. 1.

Referring to the drawings by designating characters, $a$ is the saw-plate, $b$ the tooth openings therein, $c$ the tooth guiding projections upon the edges of these openings which engage corresponding grooves in the edges of the tooth $e$, $d$ is the chamber at the bottom of such opening into which the washers $f$ are inserted, and over which the slot $s$ at the lower end of the tooth slides, when the tooth is inserted in its plate opening $b$.

$g$, as shown in the drawings, is a rivet which passes through the holes in the lower end of the tooth and through the hole in the washer $f$, and is headed or swaged up on each side of the tooth thus fastening the washer and tooth together, and by the bearing of the washer against the lower ends of the tooth guiding projections $c$, any outward movement of the tooth is prevented. The teeth are offset near their upper end as shown at $h$, Fig. 2.

When any tooth is broken or worn so as to lack utility, it is only necessary to drive out the rivet and the tooth can then be readily removed without injuring or marring the saw-plate in any manner, and a new tooth inserted and secured with the same facility.

I claim:

1. A separable tooth for saws, consisting of a strip of steel having a cutting edge at one end, and at the other end means to engage a socket in the saw-plate, a separable washer relatively thinner than the saw plate supported centrally thereof in the socket and held against longitudinal movement therein, a slot in the inner end of the tooth parallel with the sides thereof and centrally between the same, adapted to receive the said washer, and means to lock the tooth and washer together.

2. Means for securing separable teeth to a saw-plate, consisting of openings in the edge of the plate which receive the ends of the teeth and interlocking means to prevent lateral movement of the teeth therein, a washer relatively thinner than the tooth and seated in the lower end of the opening in the plate, a slot centrally located between the sides of the tooth at the lower end thereof to receive the washer when the tooth is inserted in the opening, and means to secure the tooth and washer together.

ALFRED M. REMINGTON.

Witnesses:
GEORGE L. PARMENTER,
ANNA R. CARROLL.

Copies of this patent may be obtained for five cents each, by addressing the "Commissioner of Patents, Washington, D. C."